United States Patent
Noriega, II et al.

(10) Patent No.: US 12,263,549 B2
(45) Date of Patent: Apr. 1, 2025

(54) CARBIDE SEAT REMANUFACTURING

(71) Applicant: Caterpillar Inc., Peoria, IL (US)

(72) Inventors: Abel Noriega, II, Corinth, MS (US);
Curtis John Graham, Peoria, IL (US);
Christopher Anthony Kinney, Iuka, MS (US); Connor J Docherty, Fort Worth, TX (US); Blake Messer, Weatherford, TX (US)

(73) Assignee: Caterpillar Inc., Peoria, IL (US)

( * ) Notice: Subject to any disclaimer, the term of this patent is extended or adjusted under 35 U.S.C. 154(b) by 5 days.

(21) Appl. No.: 18/237,365

(22) Filed: Aug. 23, 2023

(65) Prior Publication Data
US 2025/0065452 A1 Feb. 27, 2025

(51) Int. Cl.
*B23P 6/00* (2006.01)
*B24B 15/02* (2006.01)
*E21B 43/26* (2006.01)

(52) U.S. Cl.
CPC .............. *B23P 6/00* (2013.01); *B24B 15/02* (2013.01); *E21B 43/2607* (2020.05)

(58) Field of Classification Search
CPC ......... B23P 6/00; B24B 15/02; E21B 43/2607
See application file for complete search history.

(56) References Cited

U.S. PATENT DOCUMENTS

| | | | | |
|---|---|---|---|---|
| 4,999,911 A | * | 3/1991 | Anderson | B23P 6/00 29/402.06 |
| 6,339,877 B1 | * | 1/2002 | Straub | B23P 6/00 29/888.42 |
| 7,216,427 B2 | * | 5/2007 | Trudeau | F01L 3/22 29/888.06 |
| 7,861,738 B2 | * | 1/2011 | Erbes | B23P 6/00 29/402.06 |
| 8,291,927 B2 | * | 10/2012 | Johnson | F16K 25/005 29/888.42 |
| 8,474,140 B2 | * | 7/2013 | Erbes | B24B 5/04 29/890.128 |
| 9,228,553 B2 | * | 1/2016 | Kosiorek | B23P 6/00 |
| 9,422,886 B2 | * | 8/2016 | Farooqui | F01L 3/22 |
| 2010/0236533 A1 | * | 9/2010 | Meldolesi | F01L 3/22 123/188.8 |
| 2015/0007792 A1 | * | 1/2015 | Farooqui | F01L 3/02 123/193.5 |

FOREIGN PATENT DOCUMENTS

KR 20210068057 A * 6/2021 .............. F02F 1/20

* cited by examiner

*Primary Examiner* — Bayan Salone

(57) ABSTRACT

Typically, fluids used in fracking operations erode valve seats in the fluid end of the reciprocating pump. Thus, these valve seats must frequently be replaced by new valve seats. Accordingly, a remanufacturing process is disclosed that successively cleans and/or grinds manually or mechanically at least the carbide inserts from used valve seats until the inserts are reusable. This reduces material costs and promotes efficiency and sustainability.

10 Claims, 4 Drawing Sheets

CARBIDE SEAT REMANUFACTURING

TECHNICAL FIELD

The embodiments described herein are generally directed to carbide valve seats, and, more particularly, to a remanufacturing process for carbide valve seats.

BACKGROUND

In fracking operations, a reciprocating pump is used to fracture a subterranean formation. The reciprocating pump comprises a power end and a fluid end. The power end drives the fluid end to pump a fluid through the fluid end. During fracking operations, the pump may operate at rates of up to 1,000 strokes per minute to produce pressures of up to 25,000 pounds per square inch (psi).

The fluid end of the reciprocating pump typically comprises a plurality of valves that enable the fluid to flow into and out of the fluid end. The fluid that passes through these valves is generally an abrasive slurry of water and sand. Over time, the slurry will erode and/or pit the surfaces of the valve seats. The utility of such valve seats may be extended by grinding the surfaces of the valve seats to re-smooth the surfaces. For example, U.S. Pat. Nos. 7,861,738 and 7,216,427 disclose processes for grinding valve seats in fuel injectors and internal combustion engines, respectively.

The present disclosure is directed toward overcoming one or more of the problems discovered by the inventors.

SUMMARY

In an embodiment, a remanufacturing method for a valve seat, the remanufacturing method comprises, for each of one or more used valve seats: receiving the used valve seat, wherein the used valve seat comprises an insert, and wherein the insert comprises a tapered surface and a shoulder surface; when the insert is salvageable, cleaning the insert manually or mechanically; when the cleaned insert is sufficient for reuse, pairing the insert with a first new body having a same pocket as a prior body in which the insert was most recently used; when the cleaned insert is insufficient for reuse, grinding the tapered surface of the insert to a first depth manually or mechanically, such that at least a portion of the shoulder surface remains; when the ground insert is sufficient for reuse, pairing the insert with the first new body having the same pocket; when the ground insert is insufficient for reuse, further grinding manually or mechanically the tapered surface of the insert to a second depth, such that no portion of the shoulder surface remains; and when the further ground insert is sufficient for reuse, pairing the further ground insert with a second new body having a shallower pocket than the prior body.

In an embodiment, a remanufacturing method for a valve seat, the remanufacturing method comprises, for each of one or more used valve seats: receiving the used valve seat, wherein the used valve seat comprises an insert, and wherein the insert comprises a tapered surface and a shoulder surface; determining that the valve seat is salvageable; cleaning the insert manually or mechanically; determining that the cleaned insert is insufficient for reuse; grinding manually or mechanically the tapered surface of the insert to a first depth, such that at least a portion of the shoulder surface remains; determining that the ground insert is insufficient for reuse; further grinding the tapered surface of the insert to a second depth, such that no portion of the shoulder surface remains; and pairing the further ground insert with a new body having a shallower pocket than a prior body in which the insert was most recently used.

In an embodiment, a remanufacturing method for a valve seat, the remanufacturing method comprises, for each of a plurality of used valve seats: receiving the used valve seat, wherein the used valve seat comprises an insert, and wherein the insert comprises a tapered surface and a shoulder surface; when the insert is not salvageable, scrapping the insert manually or mechanically; when the insert is salvageable, cleaning the insert; when the cleaned insert is sufficient for reuse, pairing the insert with a first new body having a same pocket as a prior body in which the insert was most recently used; when the cleaned insert is insufficient for reuse, grinding manually or mechanically the tapered surface of the insert to a first depth, such that at least a portion of the shoulder surface remains; when the ground insert is sufficient for reuse, pairing the insert with the first new body having the same pocket; when the ground insert is insufficient for reuse, further grinding manually or mechanically the tapered surface of the insert to a second depth, such that no portion of the shoulder surface remains; when the further ground insert is sufficient for reuse, pairing the further ground insert with a second new body having a shallower pocket than the prior body; and when the further ground insert is insufficient for reuse, scrapping the insert.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
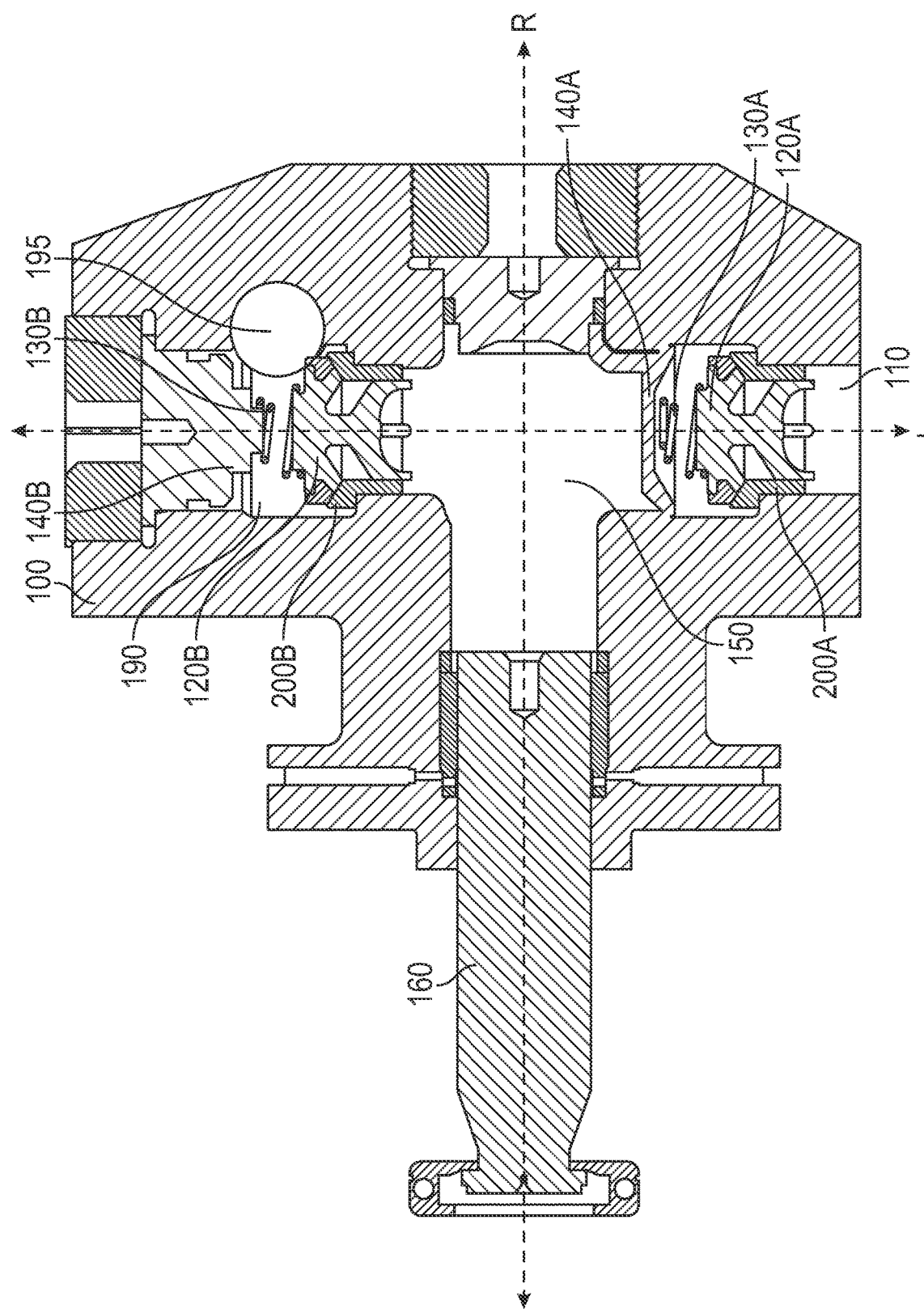
FIG. 1 illustrates a cross-sectional view of a fluid end of a reciprocating pump, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

FIG. 1 illustrates a cross-sectional view of a fluid end 100 of a reciprocating pump, according to an embodiment. A fluid may flow into an inlet 110 along a longitudinal axis L.

Inlet 110 is separated from a pressure chamber 150 by a first valve, comprising a valve head 120A and a valve seat 200A. Valve head 120A is biased to a closed position by a spring 130A that is fixed to a mounting body 140A. When spring 130A is compressed, valve head 120A separates from valve seat 200A, such that the fluid can flow from inlet 110, between valve seat 200A and valve head 120A, into pressure chamber 150. Over time, this fluid may erode valve seat 200A.

Similarly, pressure chamber 150 is separated from an outlet 190 by a second valve, comprising a valve head 120B and a valve seat 200B. Valve head 120B is biased to a closed position by a spring 130B that is fixed to a mounting body 140B. When spring 130B is compressed, valve head 120B separates from valve seat 200B, such that fluid can flow from pressure chamber 150, between valve seat 200B and valve head 120B, into an outlet chamber 190. Over time, this fluid may erode valve seat 200B. It should be understood that the second valve may be identical to the first valve, such that valve seat 200B is identical to valve seat 200A.

A plunger 160 is driven by the power end of the reciprocating pump to translate along a radial axis R, which is perpendicular to longitudinal axis L. In other words, during operation of the reciprocating pump, plunger 160 continually slides into pressure chamber 150, on a down-stroke, and slides out of pressure chamber 150 on an up-stroke. These strokes create a differential pressure that drives the first and second valves. For example, each up-stroke may cause spring 130A to compress while spring 130B decompresses, such that fluid flows from inlet 110 into pressure chamber 150. Conversely, each down-stroke may cause spring 130B to compress while spring 130A decompresses, such that fluid flows from pressure chamber 150 into outlet chamber 190.

Outlet chamber 190 may be in fluid communication with an outlet channel 195, which carries the fluid in outlet chamber 190, along an axis that is perpendicular to longitudinal axis L and radial axis R. Typically, fluid end 100 comprises a plurality of the assembly illustrated in FIG. 1, along the axis that is perpendicular to longitudinal axis L and radial axis R. In other words, the illustrated assembly may be replicated at different cross-sectional depths along this axis, such that each of a plurality of plungers 160 pump the fluid from respective inlets 110 to respective outlet chambers 190, through respective first and second valves, and into outlet channel 195. The fluid, output by all of these assemblies, may converge in outlet channel 195, which may carry the fluid to an outlet of fluid end 100.

As used herein, a reference numeral with an appended letter will be used to refer to a specific component, whereas the same reference numeral without any appended letter will be used to refer collectively to a plurality of the component or to refer to a generic or arbitrary instance of the component. Thus, for example, the term "valve seats 200" refers collectively to first valve seat 200A and second valve seat 200B, and the term "valve seat 200" may refer to either first valve seat 200A or second valve seat 200B.

In addition, as used herein, the terms "upstream" and "downstream" are relative to the flow direction of fluid through fluid end 100. For example, inlet 110 is upstream from outlet chamber 190, and outlet chamber 190 is downstream from inlet 110.

Figure 2:
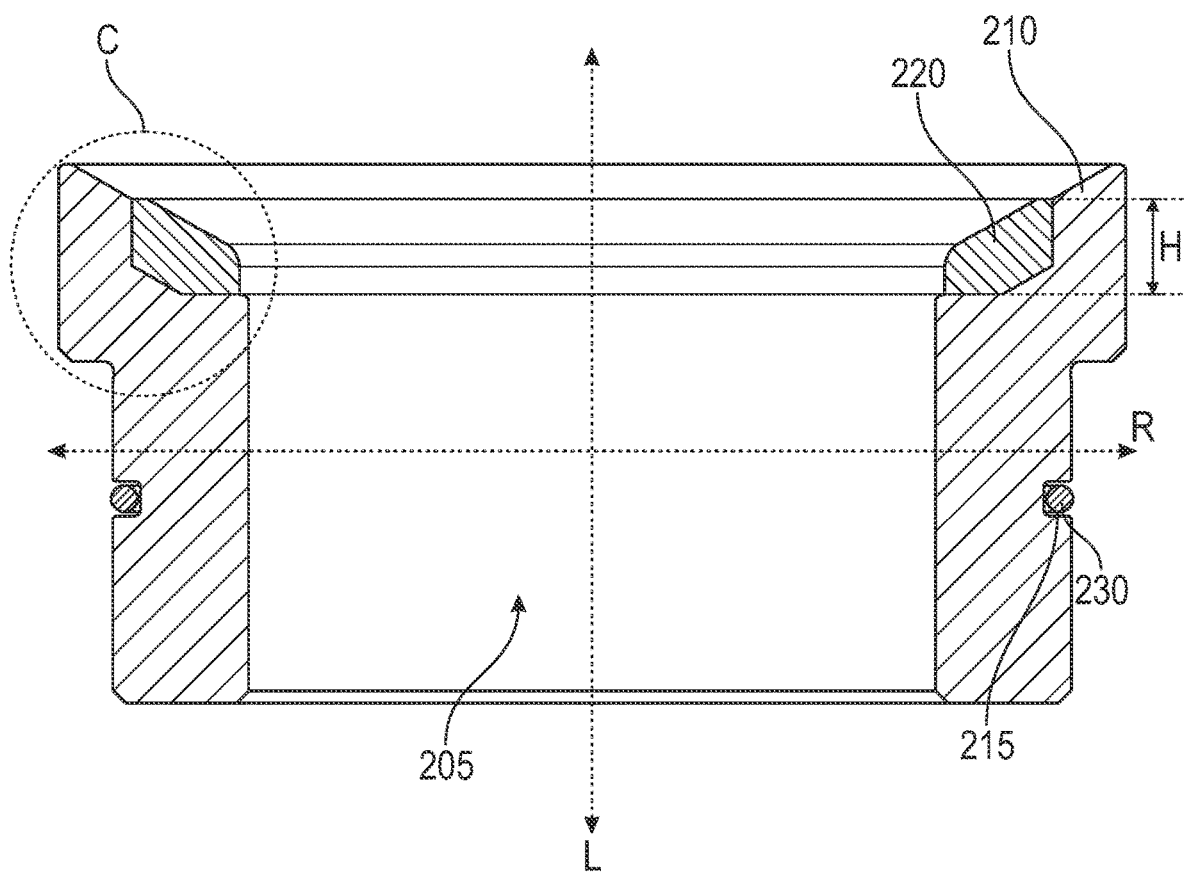
FIG. 2 illustrates a cross-sectional view of a valve seat, according to an embodiment.

FIG. 2 illustrates a cross-sectional view of a valve seat 200, according to an embodiment. Each valve seat 200 comprises a body 210 and an insert 220. Body 210 and insert 220 are both annular around longitudinal axis L with open centers, such that a channel 205 is formed therethrough. Insert 220 sits within body 210.

At all points, the outer diameter of insert 220 may match the inner diameter of body 210 from support surface 224 to a height H of insert 220, along longitudinal axis L. Thus, insert 220 fits tightly into body 210. In an embodiment, the radially outward facing surface of insert 220, along radial axis R, may form a friction fit with the radially inward facing surface of body 210, along radial axis R. Thus, body 210 and insert 220 may be joined by a press-fit. Alternatively, body 210 and insert 220 may be joined by a shrink-fit, bonding, sintering, welding, and/or the like.

Body 210 may comprise a groove 215 along an outer circumference of body 210. Groove 215 may be positioned upstream from support surface 224 and insert 220. Groove 215 may be configured to hold an O-ring 230. When inserted with fluid end 100, O-ring 230 may be compressed within groove 215 by the body of fluid end 100, to thereby seal the area around valve seat 200. The seal formed by O-ring 230 prevents fluid from flowing past valve seat 200, except through channel 205.

In an embodiment, insert 220 is made of a carbide material, which includes any binary compound of carbon with an element of lower or comparable electronegativity. Inserts 220 made from a carbide material tend to be very hard and wear resistant. Examples of carbide materials include, without limitation, tungsten carbide, tungsten carbide nickel, tungsten carbide cobalt, titanium carbide, or the like. Alternatively, insert 220 could be made of another material, including another ceramic material, such as zirconia, partially stabilized zirconia, silicon nitride, sialon, or the like. Body 210 may be made of the same material as insert 220 (e.g., a carbide) or a different material than insert 220.

Figure 3:
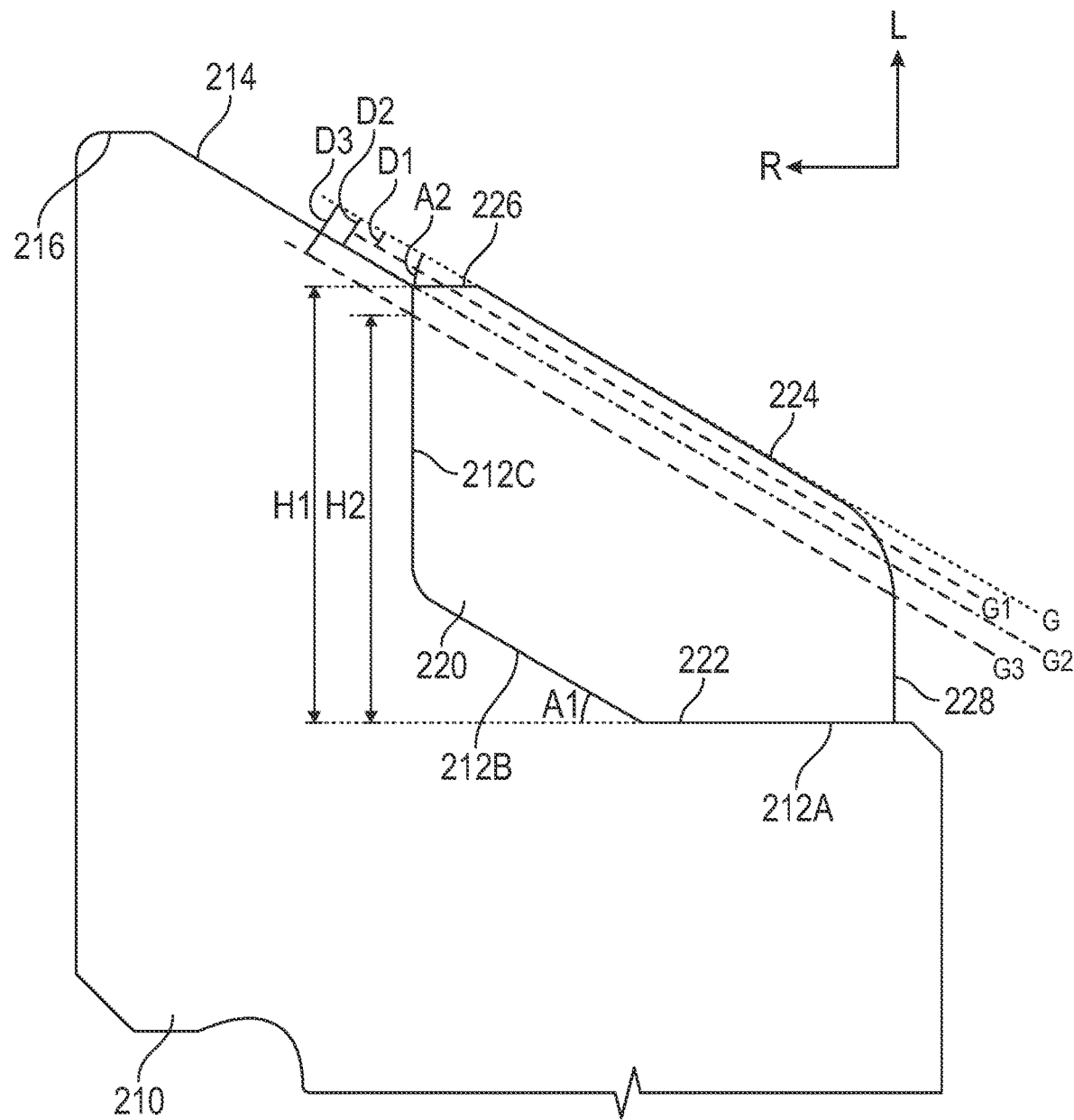
FIG. 3 illustrates a cross-sectional view of the portion of the valve seat in circle C in FIG. 2, according to an embodiment.

FIG. 3 illustrates a cross-sectional view of a portion of the valve seat 200 in circle C in FIG. 2, according to an embodiment. Insert 220 sits on a support surface 212 of body 210. Support surface 212 may comprise a first portion 212A, a second portion 212B, and a third portion 212C. First portion 212A may be generally perpendicular to longitudinal axis L and parallel to radial axis R. Second portion 212B may taper downstream radially outward, beginning from a certain diameter representing the radially outer end of first portion 212A, to an outer diameter of support surface 212, at an angle A1 with respect to radial axis R. Angle A1 of the tapered second portion 212B may be any suitable angle between 0 degrees and 90 degrees, but is generally in the range of 20-70 degrees, and preferably at or around 30 degrees, relative to radial axis R (i.e., 60 degrees relative to longitudinal axis L). In an alternative embodiment, second portion 212B may be omitted. Third portion 212C may be generally parallel to longitudinal axis L and perpendicular to radial axis R. A downstream end of third portion 212C may transition into a tapered surface 214, which may taper at the same angle A1 as second portion 212B of support surface 212 or at a different angle. The downstream end of tapered surface 214 may transition into a shoulder surface 216, which may be generally perpendicular to longitudinal axis L and parallel to radial axis R.

Insert 220 may comprise a supported surface 222, which has a profile that matches support surface 212. In other words, supported surface 222 may have an outer diameter that is identical to, slightly greater than, or slightly less than the inner diameter of support surface 212, such that a tight fit is formed between support surface 212 of body 210 and supported surface 222 of insert 220. A downstream end of supported surface 222 transitions into a shoulder surface 226, which may be generally perpendicular to longitudinal axis L and parallel to radial axis R. An upstream end of supported surface 222 transitions into an inner surface 228, which may be generally parallel to longitudinal axis L and perpendicular to radial axis R.

Insert 220 also comprises a tapered surface 224, between shoulder surface 226 and inner surface 228. Tapered surface 224 may taper downstream radially outward at an angle A2 with respect to radial axis R. Angle A2 may be the same as or different from angle A1. At an upstream end, tapered surface 224 may curve into inner surface 228.

There are a number of manners in which valve seat 200 may be ground. In a first case, tapered surface 224 of insert 220 may be ground, parallel to an axis G, to any depth, illustrated in three examples: depth D1 between axes G and G1; depth D2 between axes G and G2, which corresponds to tapered surface 214 of body 210 and goes up to, but not beyond, shoulder surface 226; and depth D3 between axes G and G3, which goes beyond shoulder surface 226. When insert 220 is ground to a depth between zero and D2 (i.e., not beyond shoulder surface 226), the height H of insert 220 does not change (i.e., remains H1). On the other hand, when insert 220 is ground to a depth greater than D2 (i.e., beyond shoulder surface 226), the height H of insert 220 changes from H1 to H2. In addition to grinding parallel to axis G, shoulder surface 226 of insert 220 could be ground, for example, parallel to radial axis R. Notably, this will reduce the height H of insert 220. Tapered surface 214 of body 210 may also be ground, for example, parallel to axis G (e.g., to axis G3), and/or shoulder surface 216 of body 210 may be ground, for example, parallel to radial axis R.

Figure 4:
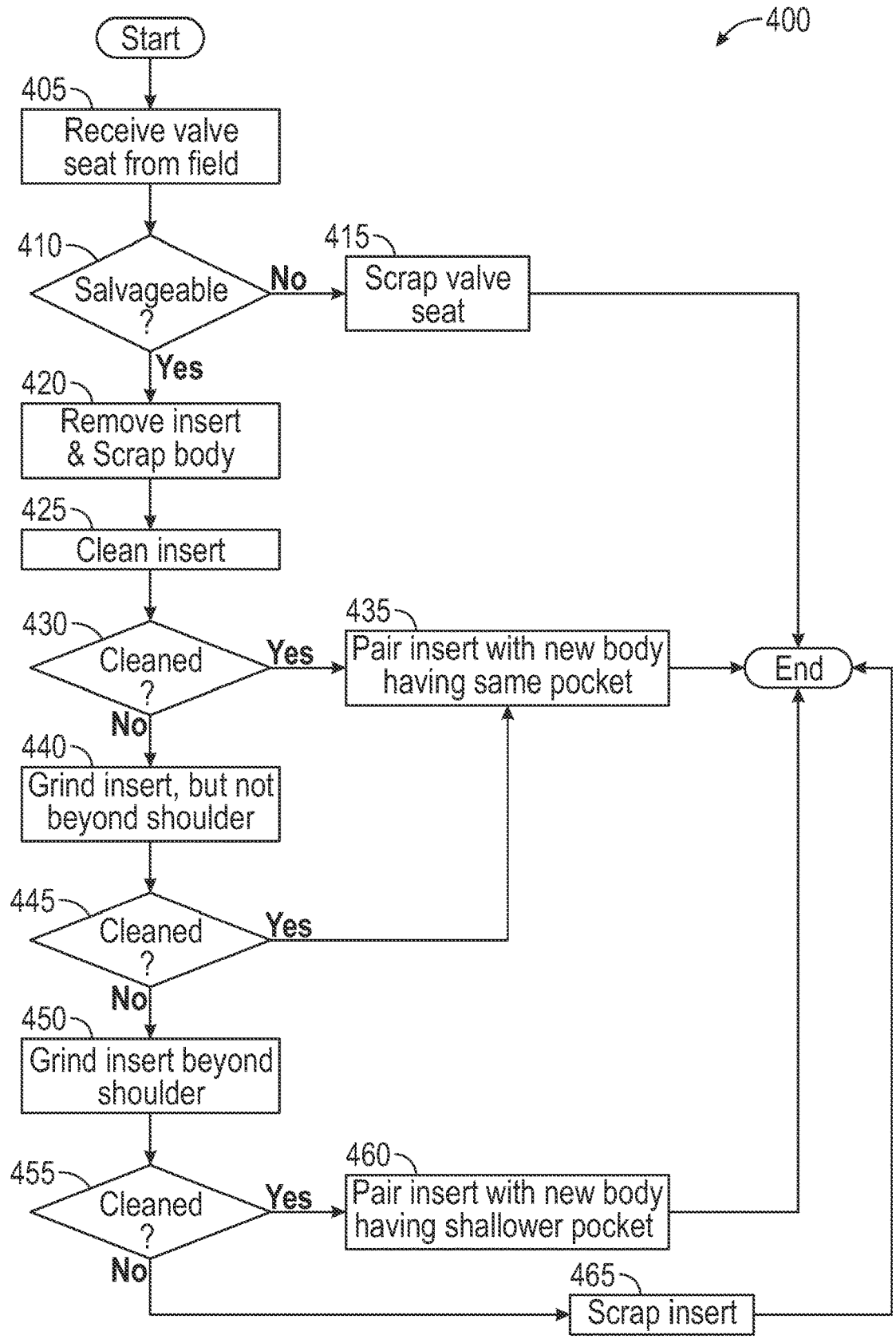
FIG. 4 illustrates a remanufacturing process for valve seats, according to an embodiment.

FIG. 4 illustrates a remanufacturing process 400 for valve seats 200, according to an embodiment. While process 400 is illustrated with a certain arrangement and ordering of subprocesses, process 400 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 400 may be implemented at a single service center or a plurality of service centers. In the latter case, different subprocesses of process 400 may be performed by different service centers. For example, the grinding may be performed at a different service center (e.g., of a supplier of valve seat 200) than the service center (e.g., of a supplier of front end 100 or the overall fracking pump) at which the other subprocesses are performed. It should be understood that the description of each subprocess in process 400 is only intended to provide examples of how the subprocess may be implemented, and that each subprocess is subject to a multitude of potential variations.

In subprocess 405, a valve seat 200 is received from the field. When a valve seat 200 needs to be serviced, it is typically received from the field through a systematic process. For example, valve seat 200 may be identified as requiring maintenance during routine inspections or due to reported issues. A service team may then be dispatched to the field to retrieve valve seat 200. The service team ensures that valve seat 200 is safely disconnected from fluid end 100, taking necessary precautions to avoid any spills or leaks. Valve seat 200 may be packaged and labeled with relevant information, such as its identification number, location, specific instructions or observations noted during the inspection, and/or the like. Valve seat 200 is then transported to a service center where valve seat 200 may undergo thorough assessment and servicing.

In subprocess 410, it is determined whether or not valve seat 200, received in subprocess 405, is salvageable. Determining whether valve seat 200 is salvageable may involve several processes and methods. A visual inspection can be conducted to assess the overall condition of the valve seat. This includes checking for signs of wear, corrosion, pitting, cracks, or any other damage on valve seat 200. Measurement tools, such as calipers or micrometers, can be employed to evaluate the dimensions of valve seat 200 components, ensuring it falls within acceptable tolerances. Non-destructive testing techniques, such as dye penetrant inspection or magnetic particle testing, can be used to detect surface cracks or defects. Additionally, ultrasonic testing may be employed to assess the thickness of valve seat 200 and identify potential areas of thinning. Based on the findings from these inspections, technicians can determine whether valve seat 200 can be salvaged. Factors such as the severity of damage, material condition, and the availability of repair techniques can contribute to making this decision. When it is determined that valve seat 200 is not salvageable (i.e., "No" in subprocess 410), process 400 proceeds to subprocess 415. Otherwise, when it is determined that valve seat 200 is salvageable (i.e., "Yes" in subprocess 410), process 400 proceeds to subprocess 420.

In subprocess 415, the entire valve seat 200, including both body 210 and insert 220, is scrapped. Valve seat 200, potentially including both body 210 and insert 220, can be removed from the system and isolated to prevent any potential contamination or safety hazards. Valve seat 200 may be then thoroughly cleaned to remove any residual fluids, contaminants, or debris. Valve seat 200 may be disassembled to separate its various components, such as body 210 and insert 220. These components can be sorted and categorized based on their material composition for recycling or proper disposal. For example, insert 220 can be sent to a scrap metal facility for recycling. Non-metallic components, such as seals or gaskets made of rubber or synthetic materials, may be disposed of in accordance with local regulations or guidelines for hazardous waste.

In subprocess 420, insert 220 is removed from body 210 of the valve seat 200, received in subprocess 405, and body 210 is scrapped. As in subprocess 415, components of body 210 can be sorted and categorized based on their material composition for recycling or proper disposal. For instance, body 210 can be sent to a scrap metal facility for recycling.

In subprocess 425, the insert 220, removed in subprocess 420, is cleaned. Cleaning insert 220 may involve several processes and methods for the effective removal of deposits and contaminants. Insert 220 may be removed from body 210 to inspect for any visible damage or wear. Insert 220 may be subjected to a combination of mechanical and chemical cleaning methods. Mechanical cleaning may involve using wire brushes, abrasive pads, scraping tools, and/or light grinding to remove stubborn deposits or scale buildup. Chemical cleaning may involve using appropriate solvents or cleaning agents that are compatible with the material of insert 220. These agents may be applied to dissolve or loosen deposits, which can then be rinsed away. Ultrasonic cleaning can also be utilized to effectively remove contaminants. In an embodiment, the cleaning process for insert 220 may be automated using one or more automated cleaning machine, such as an ultrasonic cleaning machine, automated solvent cleaning machine, high-pressure water jet cleaning machine, and/or the like. After the cleaning process, insert 220 may be thoroughly rinsed with clean water to remove any remaining cleaning agents or residues.

In subprocess 430, it is determined whether or not the cleaning in subprocess 430 was sufficient. Subprocess 430 represents a first salvage opportunity for insert 220. Determining if insert 220 has been cleaned sufficiently may include a thorough assessment of several factors. A visual inspection of insert 220 may be conducted to ensure that there are no visible signs of deposits, scale, or contaminants on the surface of insert 220. The visual inspection of insert 220 may include manual direct visual inspection and/or automated magnified visual inspection using tools such as magnifying lenses or microscopes, ultraviolet (UV) inspection using ultraviolet light to detect fluorescing deposits or contaminants, surface profiling to measure surface topography and identify irregularities, liquid penetrant inspection to reveal surface cracks or defects using colored dyes, and/or the like. Any remaining residue or deposits could indicate inadequate cleaning. Next, insert 220 may be examined for smoothness and uniformity of the surface. Rough or uneven areas suggest the presence of stubborn deposits that may require further cleaning. Additionally, insert 220 may be required to not have any discoloration or stains that could be indicative of lingering contaminants. Functional testing may be performed to validate the cleanliness of insert 220. Subprocess 430 may involve checking the fit and alignment of insert 220 with other valve seat 200 components, as well as conducting leakage or flow tests to ensure proper sealing and operation. A combination of visual inspection, surface assessment, and functional testing can help determine whether insert 220 has been cleaned sufficiently to meet the required standards to be considered reusable. Automated machines for conducting visual inspections of insert 220 can offer efficient and reliable inspection capabilities. Examples of these machines include, without limitation, Automated Optical Inspection (AOI) systems, machine vision systems, robotic inspection systems, laser scanning systems, Coordinate Measuring Machines (CMM) systems, and/or the like. AOI systems utilize cameras and image processing algorithms to detect visual defects and contaminants that may be present one the surfaces of insert 220. Machine vision systems employ cameras and image analysis techniques to capture and analyze images, enabling the identification of specific features, measurements, and defects in insert 220. Robotic inspection systems combine robots with machine vision systems for precise and repetitive inspections. Laser scanning systems use lasers to scan insert 220 surface and create detailed 3D representations. CMM systems provide dimensional analysis about surface quality of insert 220. When it is determined that the cleaning was sufficient (i.e., "Yes" in subprocess 430), process 400 proceeds to subprocess 435. Otherwise, when it is determined that the cleaning was insufficient (i.e., "No" in subprocess 430), process 400 proceeds to subprocess 440.

In subprocess 435, the insert 220, cleaned in subprocess 430, may be paired with (e.g., installed into) a new body 210 having the same pocket as the prior body 210 in which insert 220 was most recently used. A body 210 having the same pocket will have a support surface 212 with the same dimensions as the body 210 that was scrapped in subprocess 420. For instance, the axial distance, parallel to longitudinal axis L, between the upstream-most end of support surface 212 and the upstream-most end of tapered surface 214, will be equal to height H of the cleaned insert 220. It should be understood that this axial distance represents the depth of the pocket formed in body 210.

In subprocess 440, insert 220 is ground potentially up to, but not beyond, the end of shoulder surface 226. For example, tapered surface 224 of insert 220 is ground, parallel to axis G, up to, but not beyond depth D2. In this case, the overall height H of the ground insert 220 remains the same (i.e., H1) after subprocess 440 as before subprocess 440. The angle A2 of tapered surface 224 may also remain the same after subprocess 440 as before subprocess 440. However, in an alternative embodiment, the angle A2 of tapered surface 224 may be changed during grinding, such that the angle A2 is different after subprocess 440 than before subprocess 440. It should be understood that grinding in subprocess 440 removes portions of the material forming insert 220, whereas cleaning in subprocess 425 removes debris from the surface(s) of insert 220, without removing significant material from insert 220. Subprocess 440 may be accomplished through manual or machine automated means. Machine automated means for grinding insert 220 may involve the use of specialized grinding machines, such as centerless grinding machines, cylindrical grinding machines, surface grinding machines, computer numerical control (CNC) grinding machines, tool and cutter grinders, and/or the like.

In subprocess 445, it is determined whether or not the cleaning in subprocess 440 was sufficient. Subprocess 445 represents a second salvage opportunity for insert 220. Subprocess 445 may be identical or similar to subprocess 430, and therefore, will not be redundantly described herein. When it is determined that the cleaning was sufficient (i.e., "Yes" in subprocess 445), process 400 proceeds to subprocess 435. Otherwise, when it is determined that the cleaning was insufficient (i.e., "No" in subprocess 445), process 400 proceeds to subprocess 450.

In subprocess 450, insert 220 is ground some more, potentially beyond shoulder surface 226. Subprocess 450 may be identical or similar to subprocess 440, and therefore, will not be redundantly described herein. For example, tapered surface 224 of insert 220 is further ground, parallel to axis G, beyond depth D2, to a depth D3. As a result, the overall height H of the ground insert 220 decreases from H1 to H2. As one example, height H1 may be 0.450 inches (11.43 millimeters) and height H2 may be 0.424 inches (10.78 millimeters). The height H2, and correspondingly the depth D2, may be chosen based on the size of the pocket of a new body 210. For example, the pocket of the prior body 210 in which insert 220 was most recently used may have a height H1, and the pocket of a new body 210 that has the closest shallower pocket than the prior body 210, may have a height H2. In this case, insert 220 may be intentionally ground to depth D3, and therefore, height H2, even if that depth is more than is necessary to sufficiently clean insert 220, so that insert 220 can fit in the pocket of the new body 210.

In subprocess 455, it is determined whether or not the cleaning in subprocess 450 was sufficient. Subprocess 455 represents a third salvage opportunity for insert 220. Subprocess 455 may be identical or similar to subprocesses 430 and/or 445, and therefore, will not be redundantly described herein. When it is determined that the cleaning was sufficient (i.e., "Yes" in subprocess 455), process 400 proceeds to subprocess 460. Otherwise, when it is determined that the cleaning was insufficient (i.e., "No" in subprocess 455), process 400 proceeds to subprocess 465.

In subprocess 460, insert 220, ground in subprocess 450, may be paired with (e.g., installed into) a new body 210 having a shallower pocket than the prior body 210 in which insert 220 was most recently used. A body 210 having a shallower pocket will have a support surface 212 with the different dimensions than the prior body 210 that was scrapped in subprocess 420. In particular, at least the length of third portion 212C of support surface 212 of the new body 210 will be less than the length of third portion 212C of support surface 212 of the scrapped body 210. For example, the height of the new body 210 may have the same height H2 as the further ground insert 220.

In subprocess 465, the insert 220 may be scrapped. At this point, the insert 220 has been ground down to its minimum useable height H, but is still not sufficiently clean to be salvageable. Accordingly, the insert 220 is scrapped, which may comprise recycling the insert 220. Then, process 400 ends.

In an embodiment, the insert 220 may processed through more than one iteration of subprocesses 450 and 455. In particular, there may be a plurality of models of valve seat 200 that each have a different pocket height. In this case, an insert 220 may be iteratively ground to each pocket height that is associated with one of the plurality of models of valve seat 200, until either the insert 220 is determined to be sufficiently clean in subprocess 455, in which case the insert 220 can be paired with a body 210 for the model of valve seat 200 with a corresponding pocket height in subprocess 460, or the insert 220 is at the minimum pocket height among the plurality of models of valve seat 200 and is still not sufficiently clean, in which case the insert 220 should be scrapped in subprocess 465. In other words, the insert 220 is ground to successively decreasing heights, matching the pocket heights of available bodies 210, until the insert 220 is sufficiently clean, or if sufficient cleanliness is never achieved, the insert 220 is scrapped.

It should be understood that process 400 may be performed for batches of valve seats 200. Similarly, inserts 220 may be cleaned in subprocess 425 in batches and/or ground in subprocesses 440 and 450 in batches. For example, a first number of valve seats 200 may be received in subprocess 405. This first number may be separated into a second number of inserts 220 that are cleaned in subprocess 425 (i.e., "Yes" in subprocess 410) and a third number of inserts 220 that are scrapped along with their respective bodies 210 (i.e., "No" in subprocess 410). The second number of inserts 220 that are cleaned in subprocess 425 may subsequently be separated into a fourth number of inserts 220 that are installed into new bodies 210 in subprocess 435 (i.e., "Yes" in subprocess 430) and a fifth number of inserts 220 that are ground in subprocess 440 (i.e., "No" in subprocess 430). This fifth number of inserts 220 that are ground in subprocess 440 may subsequently be separated into a sixth number of inserts 220 that are installed into new bodies 210 in subprocess 435 (i.e., "Yes" in subprocess 445) and a seventh number of inserts 220 that are ground in subprocess 450 (i.e., "No" in subprocess 445). This seventh number of inserts 220 that are ground in subprocess 450 may subsequently be separated into an eighth number of inserts 220 that are installed into new bodies 210 in subprocess 460 (i.e., "Yes" in subprocess 455) and a ninth number of inserts 220 that are scrapped in subprocess 465 (i.e., "No" in subprocess 455).

Although process 400 is described with respect to salvaging insert 220, a similar process may be used to salvage body 210. In particular, tapered surface 214 may be cleaned in a similar manner as tapered surface 224 is cleaned in subprocess 425. If the cleaning is insufficient, tapered surface 214 may then be ground, parallel to axis G to a depth that does not go beyond shoulder surface 216, in a similar manner as tapered surface 224 is ground in subprocess 440. If this first grinding is insufficient, tapered surface 214 may be ground, parallel to axis G to a new depth that goes beyond shoulder surface 216, in a similar manner as tapered surface 224 is ground in subprocess 450. If the second grinding is insufficient, body 210 may be scrapped, in a similar manner as insert 220 is scrapped in subprocess 465. In any of the cases that body 210 is salvaged, the salvaged body 210 may be paired with an insert 220 that has a height H that matches the depth of the pocket after cleaning and/or grinding.

INDUSTRIAL APPLICABILITY

Valve seats 200, within a fluid end 100 of a reciprocating pump, can experience erosion when exposed to a slurry or other fluid during fracking operations. The erosive nature of these fluids, which often contain abrasive particles and chemicals, can gradually wear away the surface of valve seats 200 over time. The high velocity and turbulent flow of the fluids intensify the erosion process, leading to material loss and degradation of valve seat 200 surfaces. The combination of solid particles, chemicals, and mechanical forces creates a harsh environment that accelerates erosion, potentially compromising the functionality and sealing capability of valve seats 200.

Accordingly, a remanufacturing process 400 for valve seats 200 is disclosed. Process 400 may process the inserts 220 of valve seats 200 through subprocesses that increasingly alter the surfaces of inserts 220 until inserts 220 are deemed salvageable. In other words, process 400 provides multiple opportunities for salvaging inserts 220. These subprocesses may start with a non-destructive cleaning of inserts 220 (e.g., subprocess 425), and if that is not successful, grind the surfaces of inserts 220 to increasing depths (e.g., not beyond shoulder surface 226 in subprocess 440, or beyond shoulder surface 226 in subprocess 450) until either inserts 220 can be salvaged or further grinding would render inserts 220 unusable. Inserts 220 that are never deemed salvageable may be scrapped in subprocess 465.

Remanufacturing process 400 may offer substantial cost savings. Rather than investing in new inserts 220, which can be expensive, old inserts 220 can be salvaged through process 400. Additionally, remanufacturing process 400 promotes efficiency and sustainability. By extending the life of inserts 220, the demand for new inserts 220 is reduced, thereby minimizing the consumption of raw materials and energy required for manufacturing. This aligns with environmentally conscious practices and contributes to a more sustainable approach within the industry. Thus, remanufacturing process 400 not only offers economic benefits, but also helps conserve resources and reduce the environmental impact associated with producing new components.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a fluid end of a reciprocating pump for fracking, it will be appreciated that it can be implemented in various other types of pumps and machines with valve seats, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A remanufacturing method for a valve seat, the remanufacturing method comprising, for each of one or more used valve seats:
    receiving the used valve seat, wherein the used valve seat comprises an insert, and wherein the insert comprises a tapered surface and a shoulder surface;
    when the insert is salvageable, cleaning the insert manually or mechanically;
    when the cleaned insert is sufficient for reuse, pairing the insert with a first new body having a same pocket as a prior body in which the insert was most recently used;
    when the cleaned insert is insufficient for reuse, grinding the tapered surface of the insert to a first depth manually or mechanically, such that at least a portion of the shoulder surface remains;
    when the ground insert is sufficient for reuse, pairing the insert with the first new body having the same pocket;
    when the ground insert is insufficient for reuse, further grinding manually or mechanically the tapered surface of the insert to a second depth, such that no portion of the shoulder surface remains; and
    when the further ground insert is sufficient for reuse, pairing the further ground insert with a second new body having a shallower pocket than the prior body.

2. The manufacturing method of claim 1, further comprising, when the insert is not salvageable, scrapping the insert.

3. The remanufacturing method of claim 1, further comprising, when the further ground insert is insufficient for reuse, scrapping the insert.

4. The remanufacturing method of claim 1, wherein the used valve seat further comprises the prior body, and wherein the remanufacturing method further comprises scrapping the prior body.

5. The remanufacturing method of claim 1, wherein the used valve seat further comprises the prior body, which includes a tapered surface, and wherein the remanufacturing method further comprises one or both of cleaning or grinding the tapered surface of the prior body.

6. The remanufacturing method of claim 1, wherein the one or more used valve seats are a plurality of used valve seats, and wherein the cleaning, the grinding, and the further grinding are performed on batches of the inserts.

7. The remanufacturing method of claim 1, wherein in one or both of the grinding and the further grinding, the tapered surface is ground to an angle, relative to a longitudinal axis of the insert, that is equal to an angle, relative to the longitudinal axis, of the tapered surface before grinding.

8. The remanufacturing method of claim 1, wherein in one or both of the grinding and the further grinding, the tapered surface is ground to an angle, relative to a longitudinal axis of the insert, that is different from an angle, relative to the longitudinal axis, of the tapered surface before grinding.

9. The remanufacturing method of claim 1, wherein the further grinding is performed iteratively to a plurality of second depths until either the further ground insert is sufficient for reuse with a new body having a corresponding pocket or the further ground insert has been ground down to a minimum useable height and is still not sufficient for reuse.

10. The remanufacturing method of claim 1, wherein the insert is made of a carbide material.

* * * * *